US012789673B2

(12) United States Patent
Shinde et al.

(10) Patent No.: US 12,789,673 B2
(45) Date of Patent: Nov. 10, 2026

(54) VEHICLE SEAT LONGITUDINAL ADJUSTMENT ASSEMBLY

(71) Applicant: Brose Fahrzeugteile SE & Co. Kommanditgesellschaft, Coburg, Coburg (DE)

(72) Inventors: Sachin Shinde, Auburn Hills, MI (US); Leo Ioppolo, Washington, MI (US)

(73) Assignee: Brose Fahrzeugteile SE & Co. Kommanditgesellschaft, Coburg (DE)

( * ) Notice: Subject to any disclaimer, the term of this patent is extended or adjusted under 35 U.S.C. 154(b) by 302 days.

(21) Appl. No.: 18/413,384

(22) Filed: Jan. 16, 2024

(65) Prior Publication Data

US 2025/0229675 A1 Jul. 17, 2025

(51) Int. Cl.

*B60N 2/02* (2006.01)
*B60N 2/06* (2006.01)
*B60N 2/07* (2006.01)

(52) U.S. Cl.

CPC ....... *B60N 2/0722* (2013.01); *B60N 2/02253* (2023.08); *B60N 2/02258* (2023.08)

(58) Field of Classification Search

CPC .... B60N 2/02; B60N 2/0224; B60N 2/02246; B60N 2/02253; B60N 2/02258; B60N 2/06; B60N 2/067

See application file for complete search history.

(56) References Cited

U.S. PATENT DOCUMENTS 2,588,165 A * 3/1952 Rossmann ......... B60N 2/02246 74/89.41
2,929,439 A * 3/1960 Tanaka ............... B60N 2/02246 297/344.17
2,983,545 A * 5/1961 Garvey .............. B60N 2/02246 248/419

(Continued)

FOREIGN PATENT DOCUMENTS

CN 104802667 A * 7/2015 ........... B60N 2/0722
CN 110641323 A * 1/2020 ........... B60N 2/0722

(Continued)

*Primary Examiner* — Ryan D Kwiecinski

(74) *Attorney, Agent, or Firm* — Dickinson Wright PLLC

(57) ABSTRACT

A motor bracket assembly for use in a vehicle seat, the vehicle seat including a translatable rail, a fixed rail, and a spindle assembly, the motor bracket assembly comprising: a motor bracket including a main body, a first arm, and a second arm. The first and second arms each extend from the first lateral edge region of the main body, the first arm defines a first aperture and the second arm defines a second aperture. The motor bracket carries a motor and a spindle gear is operatively connected to the motor and configured to be operatively connected to the spindle assembly of the vehicle seat so that rotation of the spindle gear actuates the spindle assembly to translate the translatable rail along the fixed rail to adjust a longitudinal position of the vehicle seat. A gearbox including a spindle gear receptacle provided with a first end region and a second end region, the spindle gear is disposed in the spindle gear receptacle, and the first end region is disposed in the first aperture of the first arm and the (Continued)

second end region disposed in the second aperture of the second arm.

15 Claims, 9 Drawing Sheets

(56) References Cited

U.S. PATENT DOCUMENTS 3,066,907 A * 12/1962 Latimer ............. B60N 2/02246 248/420
3,124,332 A * 3/1964 Heyl, Jr. ............ B60N 2/02246 384/205
3,314,637 A * 4/1967 Fudala ............... B60N 2/02246 248/419
3,437,302 A * 4/1969 Homier .............. B60N 2/02246 248/420
3,894,708 A * 7/1975 Stanley .................... B60N 2/02 248/421
3,951,004 A * 4/1976 Heesch ................ B60N 2/0296 248/394
4,790,202 A * 12/1988 Hayashi .................... F16H 1/16 384/42
4,802,374 A * 2/1989 Hamelin ............ B60N 2/02246 74/89.32
4,805,866 A * 2/1989 Aihara ............... B60N 2/02246 297/344.1
4,832,403 A * 5/1989 Tomita ............... B60N 2/02246 297/341
4,909,468 A * 3/1990 Aihara ................... B60N 2/067 248/429
4,949,585 A * 8/1990 Dauvegne ............ B60N 2/0224 254/102
5,048,786 A * 9/1991 Tanaka ................... B60N 2/067 248/429
5,048,886 A * 9/1991 Ito ...................... B60N 2/02246 296/65.14
5,125,611 A * 6/1992 Cox ......................... B60N 2/43 248/420
5,259,257 A * 11/1993 Mouri ................ B60N 2/02246 74/425
5,292,164 A * 3/1994 Rees .................. B60N 2/02246 296/65.15
5,445,354 A * 8/1995 Gauger .............. B60N 2/02246 248/429
5,467,957 A * 11/1995 Gauger .............. B60N 2/02246 74/89.33
5,487,520 A * 1/1996 Mouri ................ B60N 2/02246 297/344.1
5,709,363 A * 1/1998 Matsuhashi ........ B60N 2/02246 248/421
5,791,622 A * 8/1998 Gauger .................. B60N 2/067 297/344.1
5,797,293 A * 8/1998 Chaban .................. B60N 2/929 74/89.36
5,797,576 A * 8/1998 Gauger .............. B60N 2/02246 248/429
6,220,642 B1 * 4/2001 Ito ...................... B60N 2/02246 296/65.14
6,499,712 B1 * 12/2002 Clark ..................... B60N 2/072 248/424
6,533,235 B1 * 3/2003 Dymerski .......... B60N 2/02246 248/421
6,626,064 B1 * 9/2003 Maue ................... B60N 2/0228 74/665 F
8,328,155 B2 * 12/2012 Kostin ................... B60N 2/067 296/65.15
9,623,768 B2 * 4/2017 Landskron ......... B60N 2/02246
10,059,227 B2 * 8/2018 Kostin ................... B60N 2/067
10,234,073 B2 * 3/2019 Abdella ................. B60N 2/682
10,793,023 B2 * 10/2020 Imamura ............ B60N 2/02246
2002/0070594 A1 * 6/2002 Mochizuki ............. B60N 2/067 297/344.1
2002/0074842 A1 * 6/2002 Dankowski ........ B60N 2/02246 297/344.17
2003/0052246 A1 * 3/2003 Hoshihara .............. B60N 2/067 248/430
2003/0168566 A1 * 9/2003 Ito ...................... B60N 2/02246 248/429
2004/0012236 A1 * 1/2004 Mallard ............... B60N 2/0276 297/344.1
2004/0094683 A1 * 5/2004 Garrido .................. B60N 2/067 297/344.11
2005/0082890 A1 * 4/2005 Taubmann ............. B60J 7/0573 297/344.1
2006/0186687 A1 * 8/2006 Kimura .............. B60N 2/02246 296/65.13
2008/0163708 A1 * 7/2008 Porinsky ............. F16H 25/2021 74/425
2008/0238126 A1 * 10/2008 Koga ..................... B60N 2/067 296/65.13
2008/0238167 A1 * 10/2008 Koga ................. B60N 2/02246 74/89.33
2008/0309137 A1 * 12/2008 Kostin ................... B60N 2/067 297/344.1
2009/0272869 A1 * 11/2009 Beneker ................. B60N 2/067 296/65.15
2010/0013285 A1 * 1/2010 Stanz ...................... F16H 25/20 297/344.13
2010/0051776 A1 * 3/2010 Koga ................. B60N 2/02246 296/65.15
2010/0060062 A1 * 3/2010 Koga ..................... B60N 2/067 297/344.1
2010/0066144 A1 * 3/2010 Schweizer ......... B60N 2/02246 297/284.8
2010/0219813 A1 * 9/2010 Ito ...................... B60N 2/02246 324/207.22
2010/0264288 A1 * 10/2010 Thuleau .................... F16C 1/06 248/429
2010/0320352 A1 * 12/2010 Weber ..................... F16H 25/20 74/89.23
2011/0023643 A1 * 2/2011 Koga ..................... B60N 2/933 74/425
2011/0031774 A1 * 2/2011 Koga ..................... B60N 2/067 296/65.15
2011/0139954 A1 * 6/2011 Ruess .................... B60N 2/067 248/429
2011/0278419 A1 * 11/2011 Sovis ................. B60N 2/02246 474/148
2012/0145868 A1 * 6/2012 Okada .................... B60N 2/067 248/429
2012/0280104 A1 * 11/2012 Veen .................. B60N 2/02246 248/671
2013/0015313 A1 * 1/2013 Schmid .................. B60N 2/067 248/429
2014/0246559 A1 * 9/2014 Landskron ......... B60N 2/02246 248/674
2014/0263891 A1 * 9/2014 Landskron ............. B60N 2/067 248/205.1
2016/0082863 A1 * 3/2016 Kostin ............... B60N 2/02246 248/429
2017/0021741 A1 * 1/2017 Kanehira ........... B60N 2/02246
2017/0197524 A1 * 7/2017 Runde .................. B60N 2/0705
2017/0267125 A1 * 9/2017 Fujita ...................... F16H 25/20
2017/0307053 A1 * 10/2017 Riester ................... B60N 2/067
2017/0368961 A1 * 12/2017 Murakami ........... B60N 2/0722
2018/0029508 A1 * 2/2018 Carl ....................... B60N 2/366
2018/0058626 A1 * 3/2018 Abdella ................. B60N 2/682
2018/0065507 A1 * 3/2018 Napau ...................... B60N 2/06
2018/0079326 A1 * 3/2018 Hayashi ................. B60N 2/682
2018/0258978 A1 * 9/2018 Yuen .................. B60N 2/02246
2019/0061564 A1 * 2/2019 Ito ........................ B60N 2/0715
2019/0135138 A1 * 5/2019 Duhamel ........... B60N 2/02246
2019/0210488 A1 * 7/2019 Fujita ..................... B60N 2/067
2019/0260263 A1 * 8/2019 Hoffmann ................ H02K 5/26
2019/0275914 A1 * 9/2019 Schuermann ...... B60N 2/02246
2019/0291602 A1 * 9/2019 Imamura ............ B60N 2/02246
2020/0156507 A1 * 5/2020 Sprenger ............ B60N 2/02246
2020/0282870 A1 * 9/2020 Hsi ...................... B60N 2/0727
2022/0048408 A1 * 2/2022 Sprenger ................ B60N 2/067

(56) References Cited

U.S. PATENT DOCUMENTS

| | | | | |
|---|---|---|---|---|
| 2022/0105833 | A1* | 4/2022 | Napau | F16H 25/20 |
| 2022/0161695 | A1* | 5/2022 | Ando | B60N 2/165 |
| 2022/0227260 | A1* | 7/2022 | Gregor | B60N 2/02258 |
| 2022/0258650 | A1* | 8/2022 | Aktas | B60N 2/123 |
| 2022/0305962 | A1* | 9/2022 | Imamura | B60N 2/067 |
| 2023/0049188 | A1* | 2/2023 | Sprenger | B60N 2/02258 |
| 2023/0062040 | A1* | 3/2023 | Kuzmz | B60N 2/067 |
| 2023/0062149 | A1* | 3/2023 | Zhao | B60N 2/01508 |
| 2023/0294565 | A1* | 9/2023 | Li | B60N 2/02246 |
| 2023/0322128 | A1* | 10/2023 | Sprenger | B60N 2/02246 248/429 |
| 2023/0356631 | A1* | 11/2023 | Kim | B60N 2/02246 |
| 2024/0116403 | A1* | 4/2024 | Kim | B60N 2/067 |
| 2024/0253533 | A1* | 8/2024 | Kuntz | B60N 2/164 |
| 2025/0178487 | A1* | 6/2025 | Quast | B60N 2/02253 |
| 2025/0229675 | A1* | 7/2025 | Shinde | B60N 2/067 |
| 2025/0313133 | A1* | 10/2025 | Scheede | B60N 2/02253 |
| 2025/0332964 | A1* | 10/2025 | Quast | B60N 2/0722 |
| 2025/0360844 | A1* | 11/2025 | Quast | B60N 2/02253 |

FOREIGN PATENT DOCUMENTS

| | | | | | |
|---|---|---|---|---|---|
| CN | 114537229 | A | * | 5/2022 | B60N 2/06 |
| CN | 115195544 | A | * | 10/2022 | B60N 2/08 |
| CN | 118386958 | A | * | 7/2024 | B60N 2/0722 |
| CN | 120056819 | A | * | 5/2025 | B60N 2/075 |
| DE | 10062217 | A1 | * | 7/2002 | B60N 2/02253 |
| DE | 102007006439 | A1 | * | 9/2007 | B60N 2/067 |
| DE | 102011052045 | A1 | * | 1/2013 | B60N 2/06 |
| DE | 102013202327 | B3 | * | 6/2014 | B60N 2/02246 |
| DE | 102016215571 | A1 | * | 1/2018 | B60N 2/067 |
| DE | 102016225835 | A1 | * | 3/2018 | H02K 5/24 |
| DE | 102019207072 | A1 | * | 11/2020 | B60N 2/067 |
| DE | 102019209171 | A1 | * | 12/2020 | B60N 2/1615 |
| DE | 102019123964 | A1 | * | 3/2021 | B60N 2/14 |
| DE | 102023212903 | A1 | * | 6/2025 | B60N 2/073 |
| EP | 2003011 | A2 | * | 12/2008 | B60N 2/0705 |
| EP | 3708418 | A1 | * | 9/2020 | B60N 2/067 |
| WO | WO-9746411 | A1 | * | 12/1997 | B60N 2/0232 |
| WO | WO-2005065989 | A1 | * | 7/2005 | B60N 2/067 |
| WO | WO-2008140232 | A1 | * | 11/2008 | B60N 2/0224 |
| WO | WO-2011150489 | A1 | * | 12/2011 | B60N 2/0715 |
| WO | WO-2016031445 | A1 | * | 3/2016 | F16H 25/20 |
| WO | WO-2018054980 | A1 | * | 3/2018 | F16H 25/20 |
| WO | WO-2021159049 | A1 | * | 8/2021 | B60N 2/01508 |
| WO | WO-2022173243 | A1 | * | 8/2022 | B60N 2/0722 |
| WO | WO-2024081340 | A1 | * | 4/2024 | B60N 2/02253 |

* cited by examiner

VEHICLE SEAT LONGITUDINAL ADJUSTMENT ASSEMBLY

TECHNICAL FIELD

The present disclosure relates to vehicle seats, including vehicle seats provided with a longitudinal adjustment assembly and motor bracket assembly for the same.

BACKGROUND

A known rail adjustment system for a motor vehicle seat is disclosed in U.S. Pat. No. 8,328,155.

SUMMARY

According to one embodiment, a longitudinal adjustment assembly for use in a vehicle seat is provided. The longitudinal adjustment assembly may include at least one fixed rail, at least one translatable rail, a spindle, a gearbox, at least one gear, a motor, a transmission member, and a motor bracket. The at least one translatable rail may be configured to translate along the at least one fixed rail to adjust a longitudinal position of the vehicle seat. The spindle may be supported by the at least one fixed rail and the gearbox may be configured for attachment to the at least one translatable rail. The at least one gear may be disposed in the gear housing and configured to be operatively connected to the spindle. The transmission member may extend from the motor and into the gearbox and the transmission member may be configured to transmit rotational movement from the motor to the at least one gear. The motor bracket may include a main body and a pair of spring arms that may extend from the main body. The main body of the motor bracket may carry the motor and the pair of spring arms may be each configured to deflect away from one another as the gearbox is inserted between the pair of spring arms. Each spring arm of the pair of spring arms may be configured to move towards one another in response to the gearbox being positioned in an installed position.

According to another embodiment, a motor bracket assembly for use in a vehicle seat is provided. The vehicle seat may include a translatable rail, a fixed rail, and a spindle assembly. The motor bracket assembly may include a motor bracket, a motor, a first gear, and a gearbox. The motor bracket may include a main body, a first arm, and a second arm. The main body may include a first lateral edge region and the first and second arms may each extend from the first lateral edge region of the main body. The first arm may define a first aperture and the second arm may define a second aperture. The motor may be carried by the motor bracket and the first gear may be operatively connected to the motor and configured to be operatively connected to the spindle assembly of the vehicle seat. As the first gear rotates, the spindle assembly may be actuated to translate the translatable rail along the fixed rail to adjust a longitudinal position of the vehicle seat. The gearbox may include a first gear receptacle that may be provided with a first end region and a second end region. The first gear may be disposed in the first gear receptacle and the first end region may be disposed in the first gear receptacle. The first end region may be disposed in the first aperture of the first arm and the second end region may be disposed in the second aperture of the second arm.

According to yet another embodiment, a method of assembling a motor bracket assembly for use in a vehicle seat is provided. The method may include: Attaching a motor to a main body of a motor bracket, the main body of the motor bracket may include a first edge region and a second end region, and the motor bracket may include a first spring arm and a second spring arm. The first and second spring arms may extend from the first edge region of the main body; inserting a gearbox between the first spring arm and the second spring arm so that the first spring arm deflects outwardly and away from the second spring arm; and Fixing the gearbox to the motor bracket. The fixing step may include the first spring arm deflecting inwardly towards the second spring arm so that the gearbox is fixed to the first spring arm and the second spring arm.

DETAILED DESCRIPTION

Figure 1:
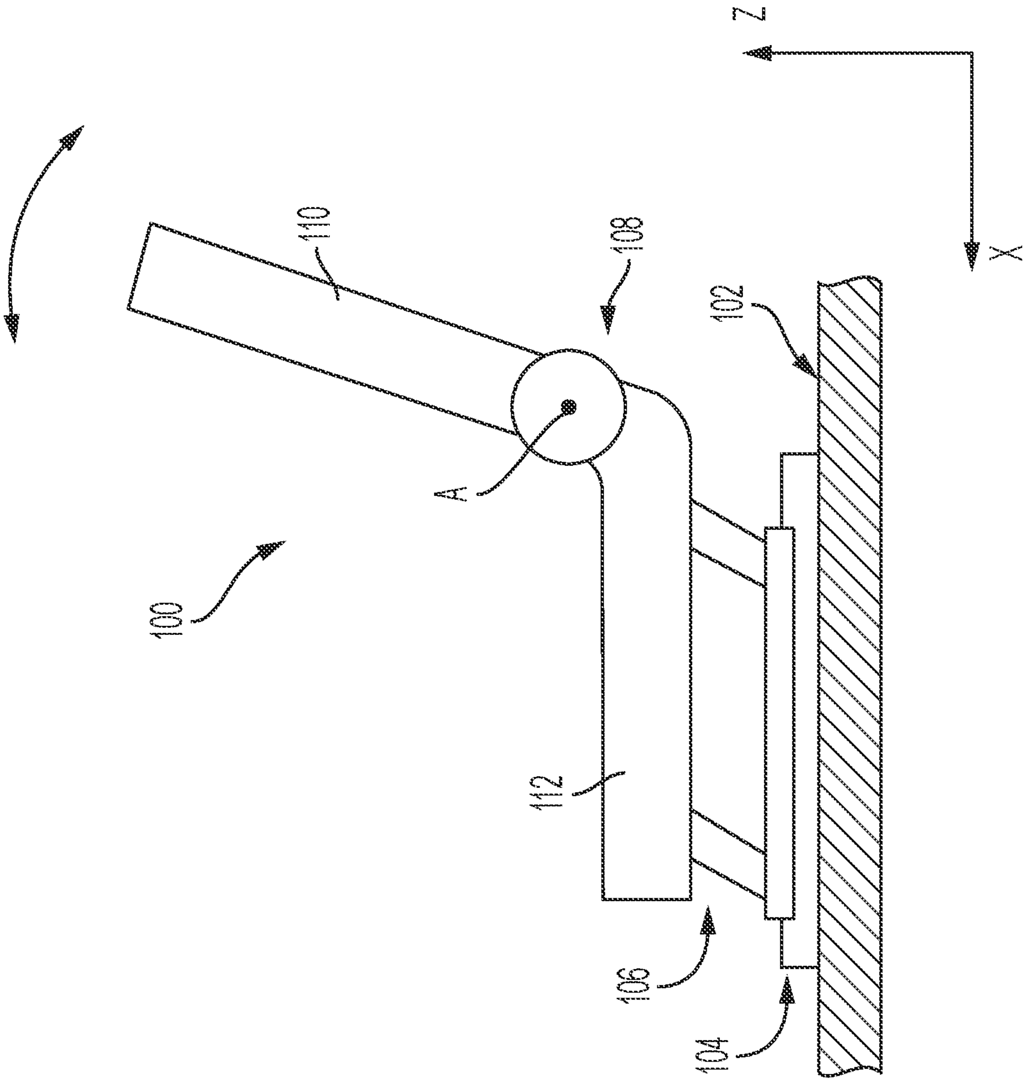
FIG. 1 is a schematic diagram of an exemplary vehicle seat assembly.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative bases for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

“A”, “an”, and “the” as used herein refers to both singular and plural referents unless the context clearly dictates otherwise. By way of example, “a processor” programmed to perform various functions refers to one processor programmed to perform each and every function, or more than one processor collectively programmed to perform each of the various functions.

The term “curvilinear” as used herein refers to a shape consisting of a curved line or curved lines.

The term "substantially" or "about" may be used herein to describe disclosed or claimed embodiments. The term "substantially" or "about" may modify a value or relative characteristic disclosed or claimed in the present disclosure. In such instances, "substantially" or "about" may signify that the value or relative characteristic it modifies is within ±0%, 0.10%, 0.5%, 1%, 2%, 3%, 4%, 5% or 10% of the value or relative characteristic.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). The term "and/or" includes any and all combinations of one or more of the associated listed items.

Although the terms first, second, third, etc. may be used to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIG. 1 shows an exemplary vehicle seat 100 attached to a vehicle floor 102. The vehicle seat 100 may include a longitudinal adjustment assembly 104 and an upper frame assembly 106. A recliner assembly 108 may be fixed to a portion of the upper frame assembly 106, such as a seat cushion portion 112, and a back frame 110 may be fixed to the recliner assembly 108. The recliner assembly 108 may be configured to pivot or rotate the back frame 110, as represented by the directional arrows, about a recliner axis A. The longitudinal adjustment assembly 104 is configured to move the upper frame assembly 106 and back frame 110 in a longitudinal direction, as indicated by the x-axis. The upper frame assembly 106 may be configured to move the seat cushion portion 112 and back frame 110 towards and away from the longitudinal adjustment assembly 104, as indicated by the z-axis.

Figure 2:
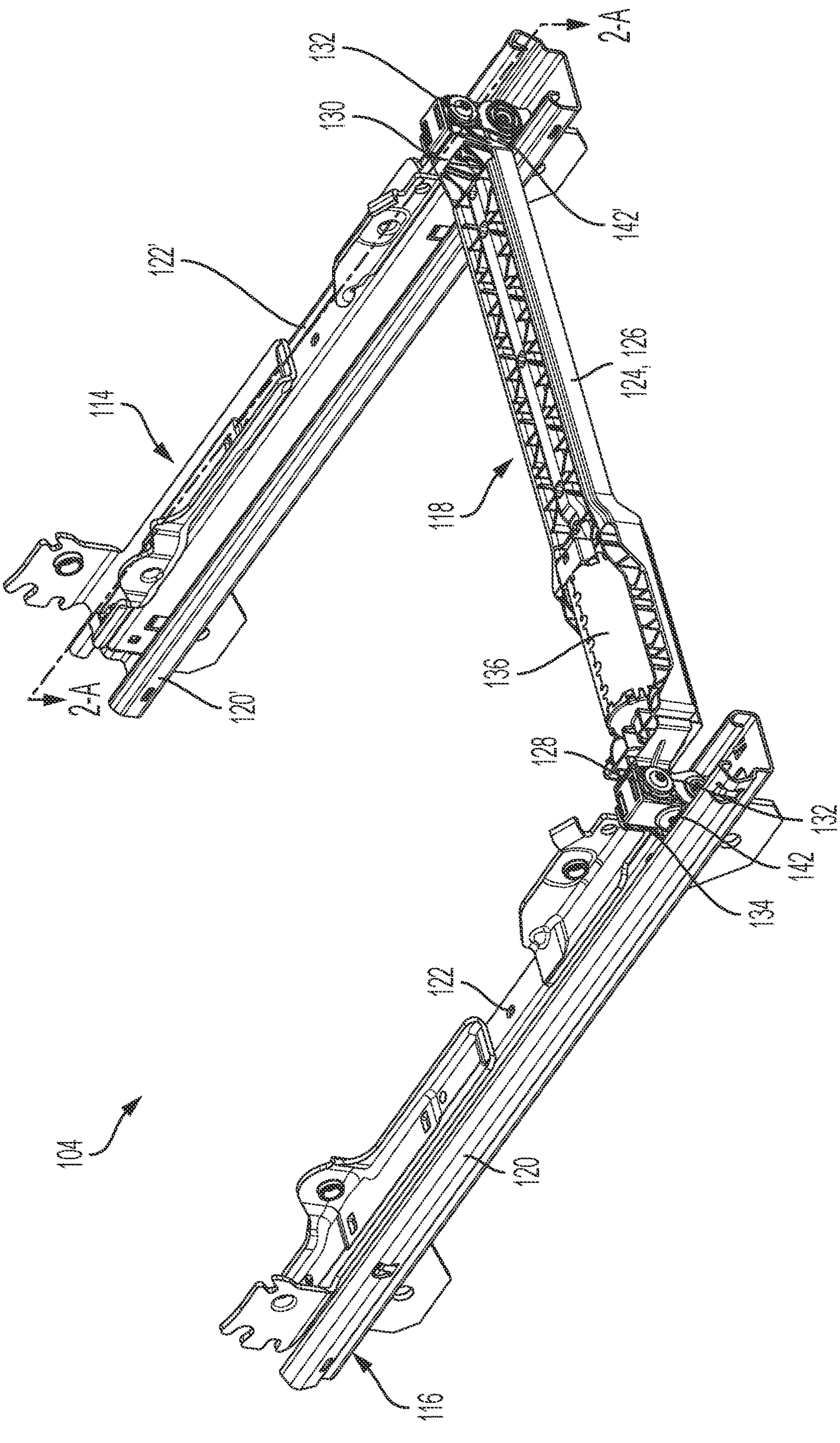
FIG. 2 is a perspective view of an exemplary longitudinal adjustment assembly of the vehicle seat illustrated in FIG. 1.

FIG. 2 show an exemplary longitudinal adjustment assembly 104 according to one or more embodiments. The longitudinal adjustment assembly 104 may include an inboard rail assembly 116, an outboard rail assembly 114, and a motor bracket assembly 118 extending between the inboard rail assembly 116 and the outboard rail assembly 114. Each of the rail assemblies 114, 116 may include a fixed rail such as an inboard fixed rail 120' and an outboard fixed rail 120. And each of the rail assemblies 114, 116 may include a translatable rail, such as a inboard translatable rail 122' and an outboard translatable rail 122. The translatable rails 122, 122' may be configured to translate along each of the fixed rails 120, 120' to adjust a longitudinal position of the vehicle seat 100.

The motor bracket assembly 118 may include motor bracket 124 and a motor 136 configured to actuate to adjust the longitudinal adjustment position of the vehicle seat 100. The motor bracket 124 may include a main body 126 that may carry or support the motor 136, and the main body 126 may include a first edge region 128 and a second edge region 130. The first edge region 128 and the second edge region 130 may each include one or more (e.g., two) spring arms 132, 134. As will be described in greater detail below, the first spring arm 132 and the second spring arm 134 may be collectively configured for attachment to a gearbox, such as an outboard gearbox 142 and an inboard gearbox 142'.

Figure 2A:
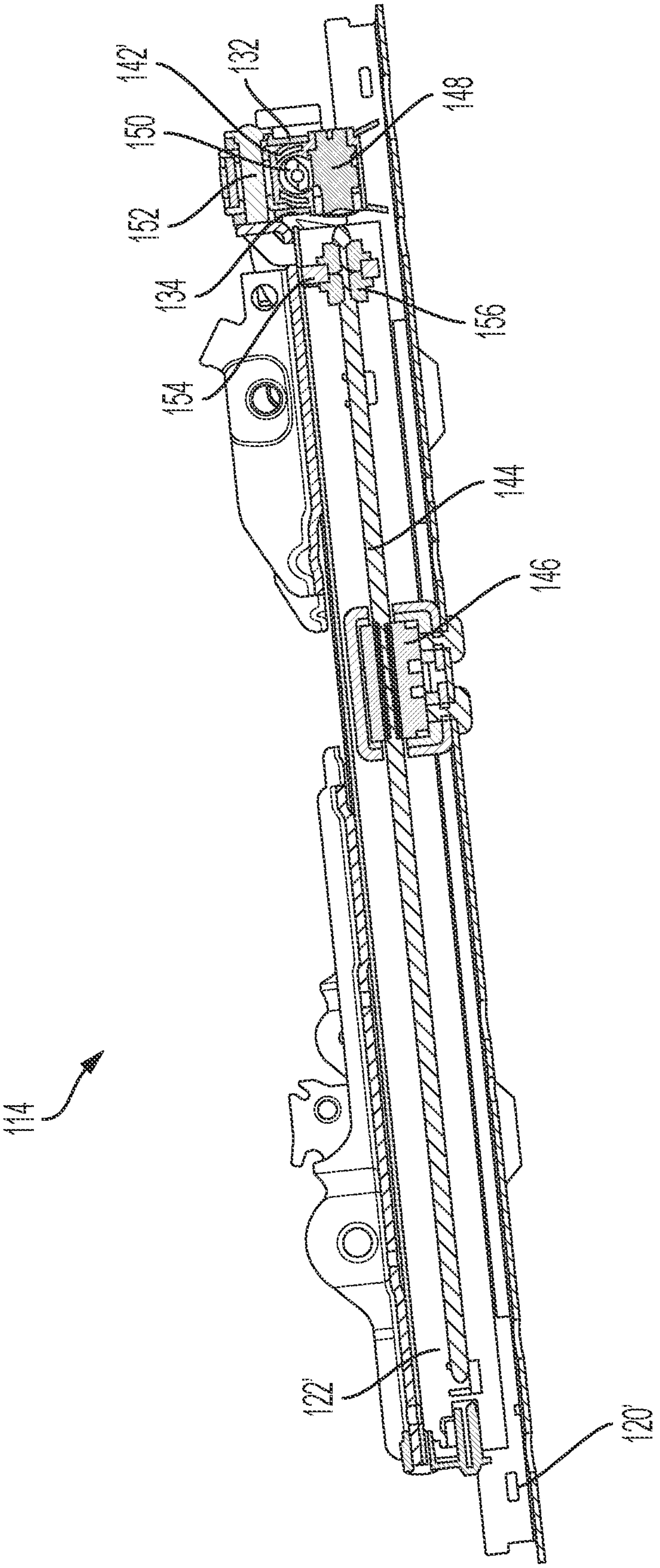
FIG. 2A is a cross-sectional view of an inboard rail assembly of the longitudinal adjustment assembly taken along the lines 2-A in FIG. 2.
Figure 3:
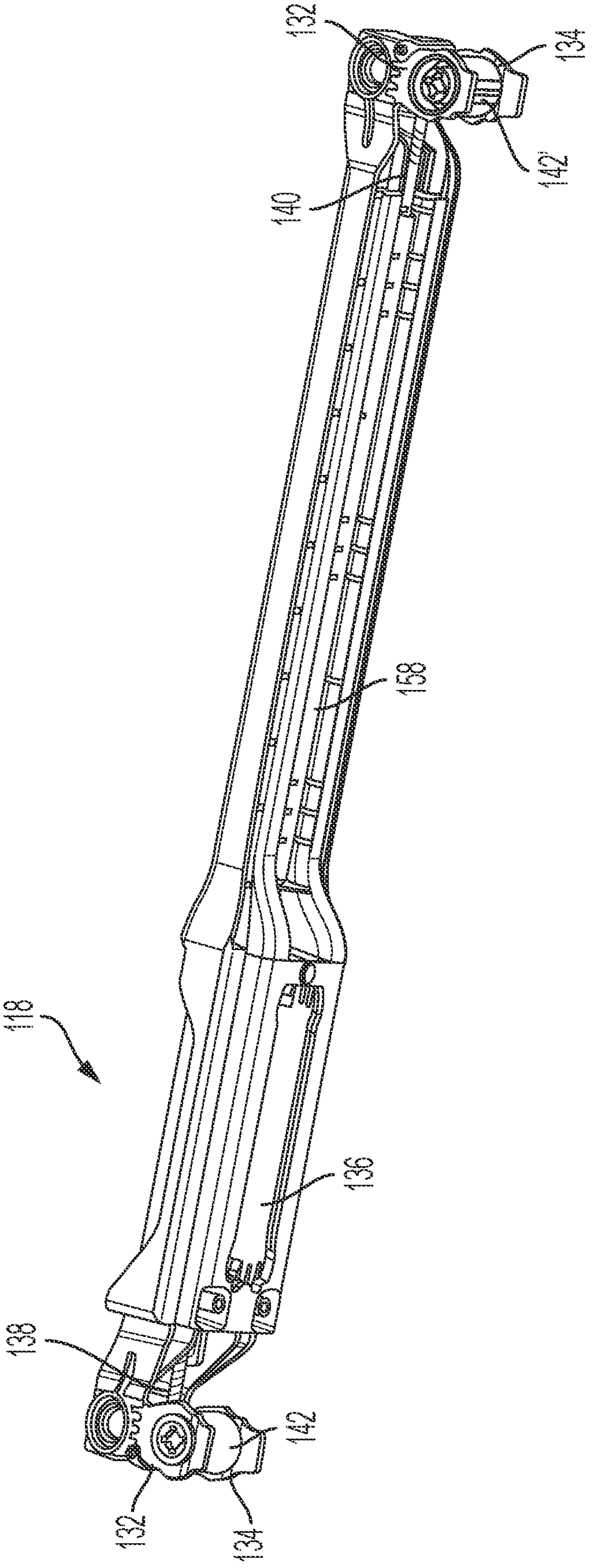
FIG. 3 illustrates a perspective view of an exemplary motor bracket assembly.

FIG. 2A illustrates a cross-sectional view of the inboard translatable rail assembly 114. FIG. 3 illustrates a perspective view of the motor bracket assembly 118. The inboard rail assembly 116 includes the inboard gearbox 142' that may receive a first gear 148 and a second gear 150 that is meshes with the first gear 148. The inboard gearbox 142' may be connected to (e.g., directly or indirectly) to the translatable rail 122' by an attachment fastener 152. The second gear 150 may be operatively connected to the motor 136 so that rotation of the motor 136 rotates the second gear 150 and as the second gear 150 rotates, the first gear 148 rotates.

The first gear 148 may be operatively coupled to (e.g., directly connected) to a spindle 144 that may be disposed between the translatable rail 122' and the fixed rail 120'. The spindle 144 may be operatively connected to a spindle nut 146 and the translatable rail 122'. As an example, the spindle nut 146 may be fixed to the fixed rail 120' and a spindle bracket 154 and spindle bushing 156 may connect the spindle 144 to the translatable rail 122' so that as the first gear 148 rotates, the spindle 144 rotates and translates with respect to the spindle nut 146 to adjust a longitudinal position of the translatable rail 122' and the vehicle seat assembly 100.

In one or more embodiments, the motor 136 may be operatively connected to the outboard gearbox 142 and the inboard gearbox 142' by one or more transmission members. As an example, a first transmission member 138 may extend from one side of the motor 136 to the second gear 150 disposed in the outboard gearbox 142 and the second transmission member 140 may extend from the other side of the motor 136 to the second gear 150 disposed in the inboard gearbox 142'. Each of the transmission members 138, 140 may be formed by a semi-rigid material and ends of each transmission member 138, 140 may be disposed within an aperture defined by each of the first gears 150 and the other ends of the transmission members 138, 140 may be disposed in an aperture defined by the motor 136. As the motor 136 rotates, rotational movement may be transmitted through the transmission member 138, 140 to the first gear 150 of the inboard and outboard gearboxes 142, 142'. In one or more embodiments, the second transmission member may include a transmission member cover 158.

The motor bracket assembly 118 may provide a number of advantages. Known longitudinal adjustment assemblies do not include motor bracket assemblies provided with a motor, transmission members, and gearboxes as a sub-assembly. Rather, these components, along with the inboard and outboard rail assemblies, are assembled in one manufacturing location. The rail assemblies are provided to the operator and the operator must install the motor, transmission members, and the gearboxes prior to connecting the gearboxes to the inboard and outboard rail assemblies.

As will be described below, the first and second arms 132, 134 that extend from the first and second edge portions 128, 130 of the motor bracket 124 enable the gearboxes to be assembled to the motor bracket 124 in a relatively easy and secure manner. This assembly process allows the motor bracket assembly 118 to be shipped to another manufacturer so that it may be integrated into the longitudinal adjustment assembly 104. One or more of the first and second arms 132, 134 may include a number of attachment features to provide a secure connection between the gearboxes 142, 142' to the motor bracket 124 without the use of fasteners or other hardware.

Figure 4B:
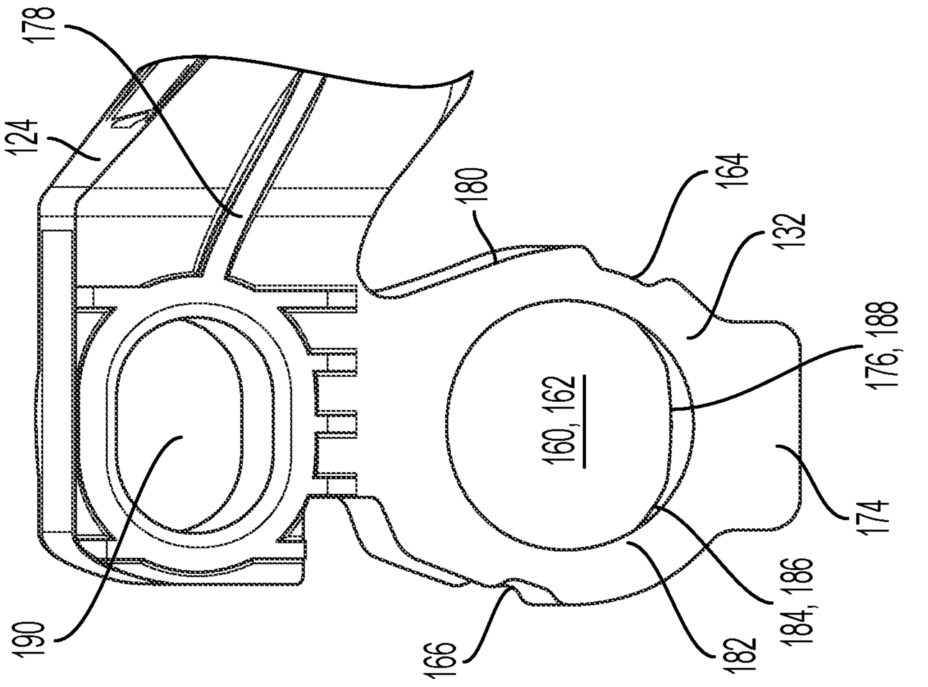
FIGS. 4A-4B illustrate a partial-plan view of a portion of a motor bracket according to one or more embodiments.
Figure 4A:
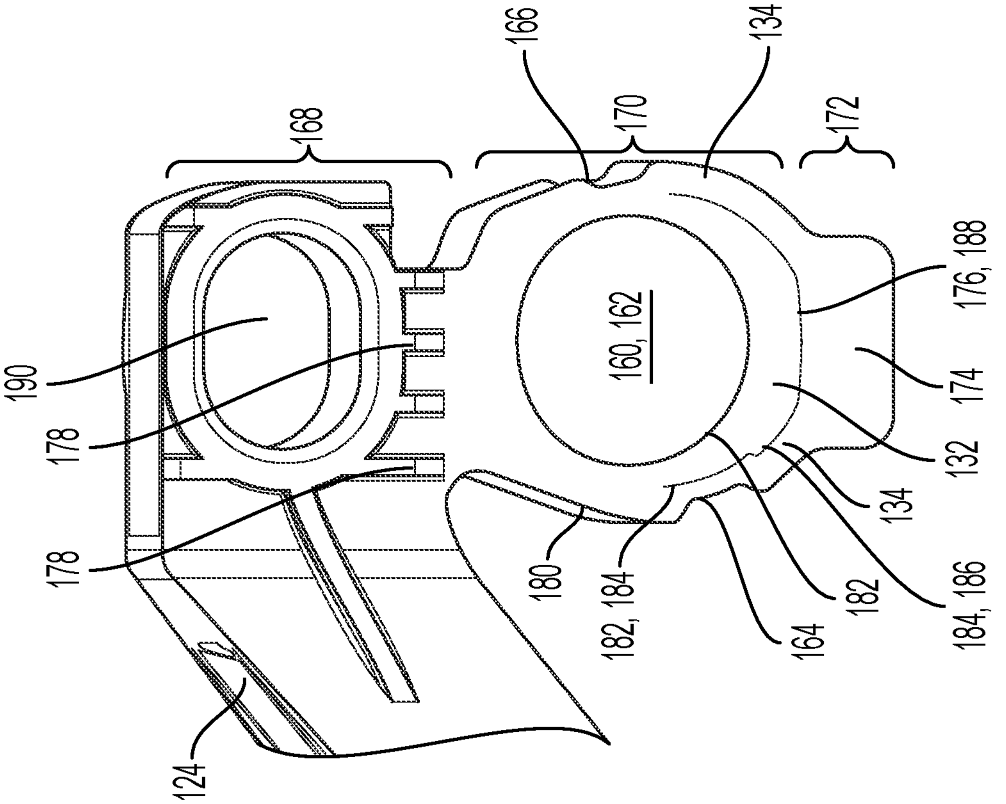
Figure 5:
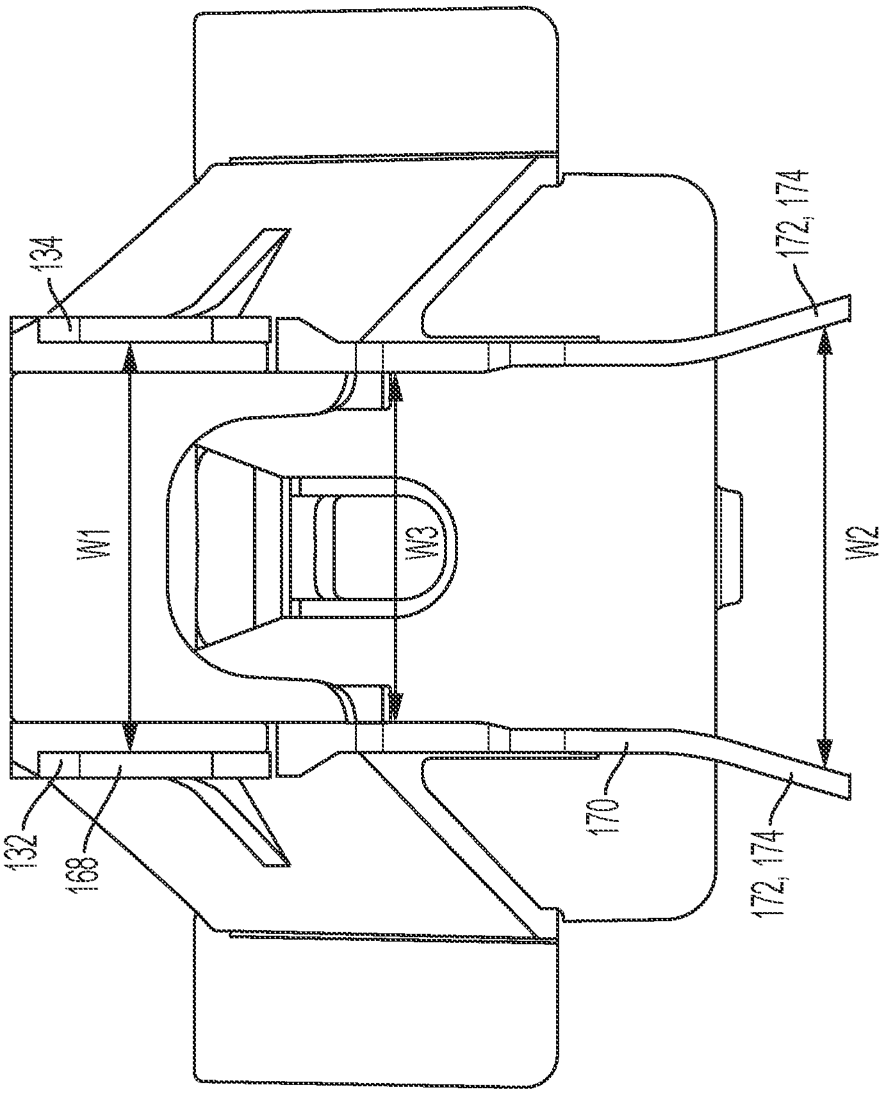
FIG. 5 illustrates a plan view of a portion of the motor bracket.

FIG. 4A and FIG. 4B illustrate a partial view of a front portion and a partial view of a rear portion of the motor bracket 124, respectively. FIG. 5 illustrates a side plan view of one end of the motor bracket 124. Each of the arms 132, 134 may include a proximal portion 168, a distal portion 172, and a medial portion 170 disposed between the proximal and distal portions 168, 172.

In one or more embodiments, the proximal portion 168 of the first arm 132 may be spaced apart from the proximal portion 168 of the second arm 134 by a first width W1, the distal portion 172 of the first arm 132 may be spaced apart from the distal portion 172 of the second arm 134 by a second width W2, and the medial portion 170 of the first arm 132 may be spaced apart from the medial portion 170 of the second arm 134 by a third width W3. As an example, the first width W1 may be less than the second width W2, and the third width W3 may be less than the first width W1 and the second width W2.

The proximal portion 168 of each of the arms 132, 134 may define an attachment aperture 190 that may be configured to receive an attachment fastener 152 (FIG. 8) configured to attach each of the inboard gearbox 142 and the outboard gearbox 142' to one or more portions of the inboard and outboard rail assemblies 114, 116, such as the translatable rails 122, 122'. In one or more embodiments, one or more structural ribs 178 may extend from an outer periphery of the attachment aperture 190 to provide additional stiffness and strength to the area surrounding the attachment apertures 190.

Figure 6B:
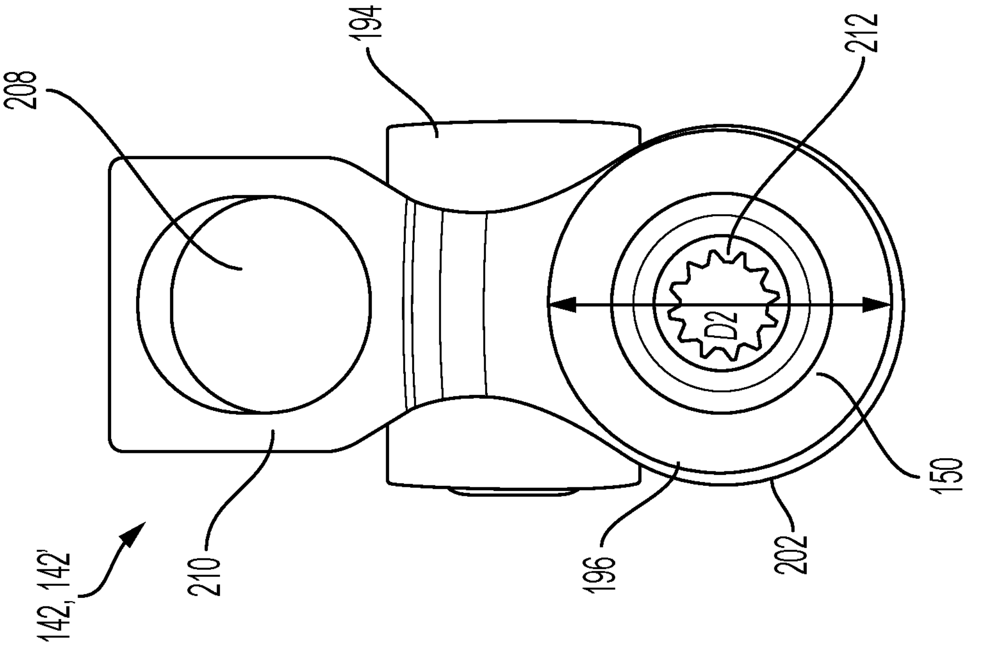
FIGS. 6A-6B illustrate front and rear plan views of an exemplary gearbox.
Figure 6A:
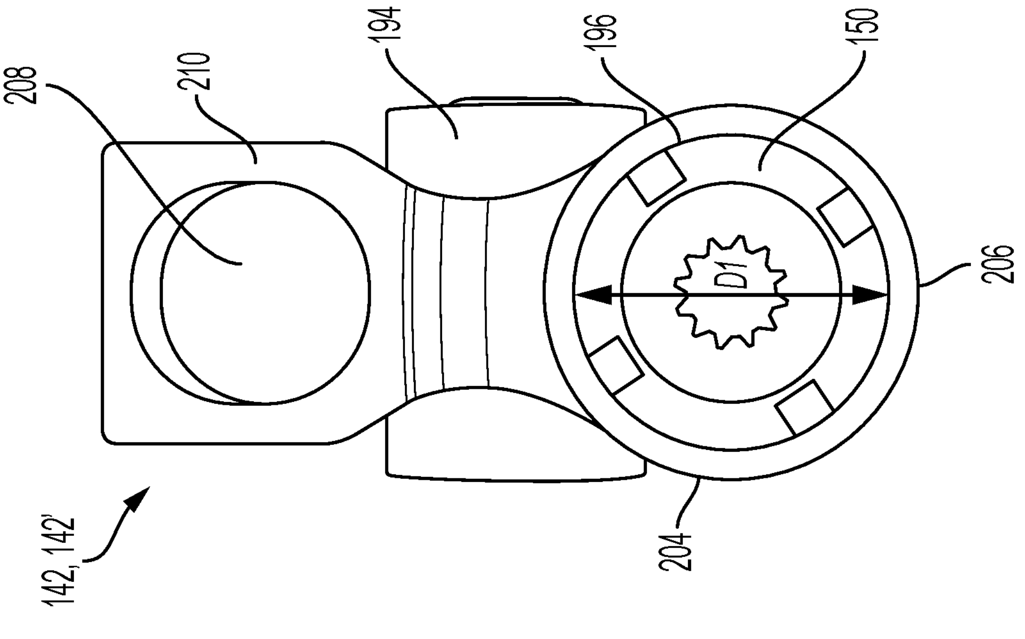

In one or more embodiments, the medial portion 170 of the first arm 132 may define a first aperture 160 and the medial portion 170 of the second arm 134 may define a second aperture 162. As shown in FIG. 6A and FIG. 6B, one or more of the gearboxes 142, 142' may include a first gear receptacle 194 or worm gear receptacle 194 configured to receive the first gear 148 or worm gear 148, and a second gear receptacle 196 or spindle gear receptacle 196. The spindle gear receptacle 196 may include a first end region 198 and a second end region 200. The first aperture 160 may be configured to receive the first end region 198 of the spindle gear receptacle 196 and the second aperture 162 may be configured to receive the second end region 200 of the spindle gear receptacle 196.

The first and second apertures 160, 162 may each be sized and shaped to engage an outer periphery of the first and second end regions 198, 200, respectively to form a press-fit or form-fit connection between the gearboxes 142, 142' and the arms 132, 134 of the motor bracket 124. At least one the first and second apertures 160, 162 may include one or more alignment features that may serve one or more purposes. As an example, an inner periphery 182 of the first aperture 160 may have a substantially circular and/or uniform shape, though other non-circular shapes are readily contemplated by this disclosure. The inner periphery 182 of the first aperture 160 may be configured to lie along an outer periphery 202 of the first end region 198 of the spindle gear receptacle 196.

An inner periphery 184 of the second aperture 162 may have a substantially circular and non-uniform shape that is configured to lie along an outer periphery 204 of the second end region 200 of the spindle gear receptacle 196. As one non-limiting example, the inner periphery 184 of the second aperture 162 may include a first section 186 and a second section 188. The first section 186 may be substantially curvilinear with a semi-circular shape and the second section 188 may be formed by a flat 176 or relatively straight line extending between ends of the first section 186.

The outer periphery 204 of the second end region of the spindle gear receptacle 196 may include one or more alignment or locating features configured to engage the second section 188 of the inner periphery 184 of the second aperture. In one or more embodiments, the outer periphery 204 of the second end region of the spindle gear receptacle 196 may have a first diameter D1 and the outer periphery 202 of the first end region 198 of the spindle gear receptacle 196 may have a second diameter D2 that may be less than the first diameter D1. This may provide a poka-yoke feature so that the gearbox may not be oriented incorrectly with respect to the first and second arms 132, 134. In other words, because the first end region 198 is only sized to fit within the first aperture 160, incorrect assembly may be prevented.

As an example, the one or more alignment features may be formed by a flat 206 configured to engage or lie along the flat 176 formed by the second section 188 of the inner periphery 184 of the second aperture 162. As one non-limiting example, after the second end region 200 of the spindle gear receptacle 196 is disposed within the second aperture, the gearbox 142, 142' may be clocked or rotated so that the attachment apertures 190 of the first and second arms 160, 162 is aligned with an attachment receptacle 208 of the gearbox 142, 142'. In at least one embodiment, the second section 188 may be disposed adjacent to the distal portion 172 of the second arm 134, so that the gearbox 142, 142' rests along the second section 188. However, the second section 188 may also be positioned in another location, such as disposed closer to the proximal portion 168 or within the center of the medial portion 170.

In at least one embodiment, one or more of the first and second arms 132, 134 may be formed so that as the gearbox 142, 142' is inserted between the first and second arms 132, 134 at least one of the first and second arms 132, 134 deflects away from the other of the first and second arms 132, 134. After the gearbox 142, 142' is in a predetermined position (e.g., an installed position) the arm 132, 134 that deflected away from the other arm may return to secure the gearbox 142, 142' between each of the arms 132, 134.

One or more of the arms 132, 134 may include one or more features to create a biased or spring-like effect between each of the arms 132, 134 and the gearbox 142, 142'. The arms 132, 134 and, as an example, the entire motor bracket 124 may be an injection molded component formed of one or more polymeric materials including thermoplastics such as Polypropylene, such as a glass-filled Polyproylene (Celstran PP-GF30-0453 P10/0), or Polyamide 66 (PA66) or another suitable material, as required.

Figure 7B:
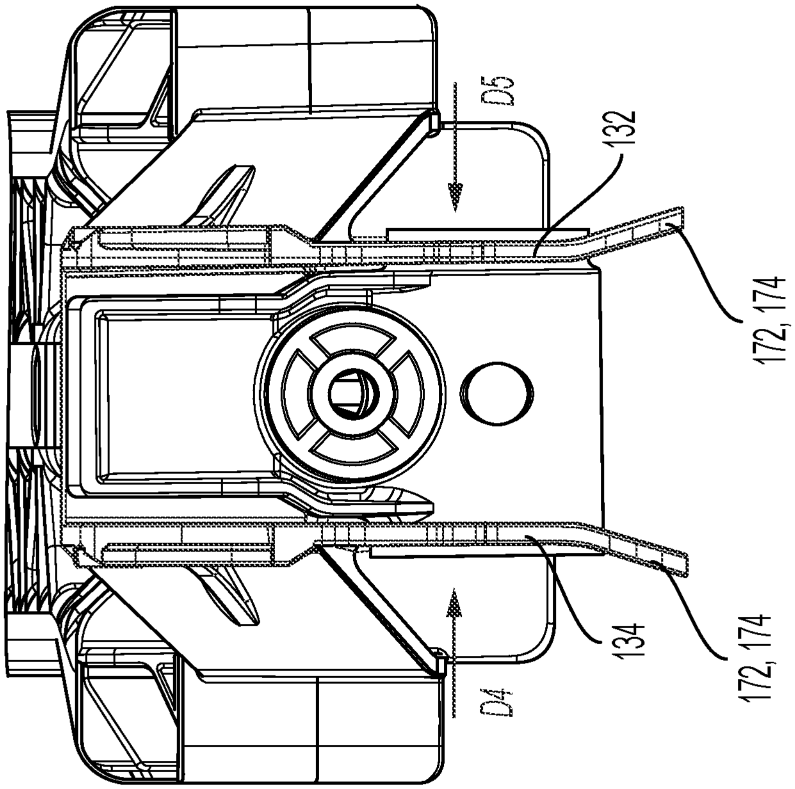
FIGS. 7A-7B illustrate partial views of the gearbox shown in FIGS. 6A-6B and the motor bracket.
Figure 7A:
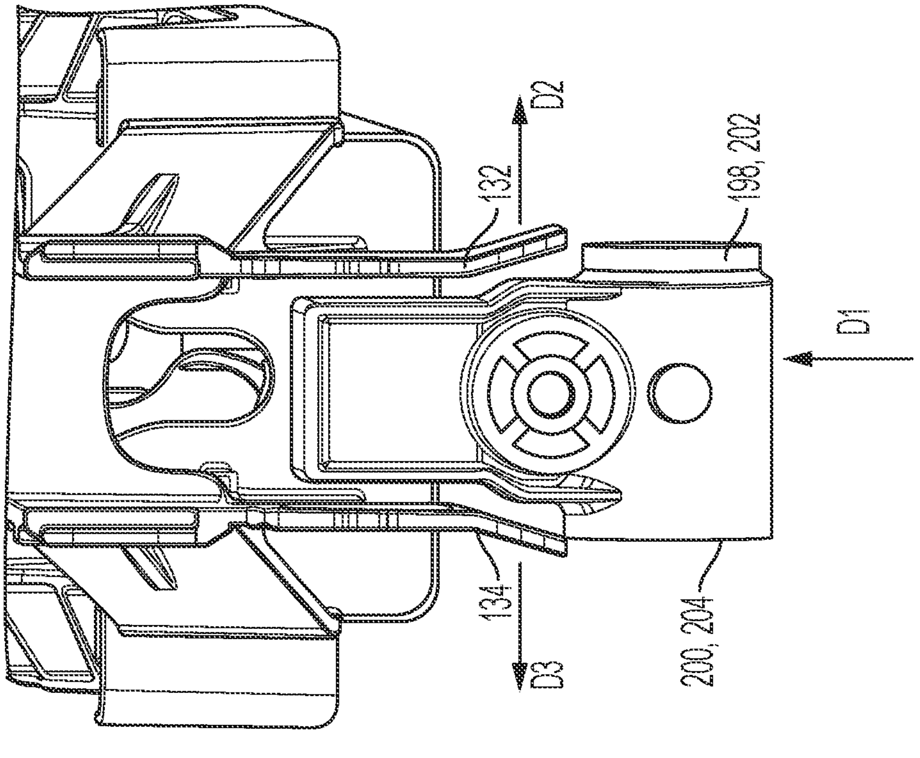

As illustrated in FIG. 7A and FIG. 7B, the first and second arms 132, 134 may be configured so that one or more of the arms 132, 134 (or both) deflect away from one another (e.g., as indicated by the directional arrows D2, D3) as the gearbox 142, 142' is inserted along the first directional arrow D1 (e.g., the vertical direction), and the arms 132, 134 may be configured to deflect or spring back towards one another to hold the gearbox 142, 142', as indicated by directional arrows D4, D5. As an example, the direction D1 or vertical direction may be substantially orthogonal to the longitudinal direction (represented by the x-axis in FIG. 1), but it should be understood that the arms 132, 134 may be configured for insertion along another direction such as parallel to the longitudinal direction. The biased or spring effect may be accomplished by forming the arms 132, 134 so that each of the arms 132, 134 have sufficient elasticity to deform (e.g., deflect) and spring back towards one another to secure the gearbox 142, 142'.

As another example, one or more of the arms 132, 134 may include one or more notches, apertures, reliefs, or cutouts to facilitate the elastic deformation and spring back properties of the arms 132, 134. In one or more embodiments, an outer periphery 180 of one or more of the arms 132, 134 may include a first cutout 164 and a second cutout 166 so that segments of the medial portion 170 of each of the arms 132, 134 have a reduced thickness as compared to other segments of the medial portion 170. The reduced segments formed by the cutouts may enable bending of the medial portion 170 as the gearbox 142, 142' is inserted between the arms 132, 134. The first and second cutouts 164, 166 may be positioned in predetermined locations to facilitate the bending movement while maintaining sufficient strength of each of the arms 132, 134. As one non-limiting example, the first cutout 164 may be disposed closer to the distal portion 172 and the second cutout 166 may be positioned closer to the proximal portion 168.

FIG. 6A shows a front view and FIG. 6B shows a rear view of the gearbox 142, 142' including the spindle gear 150. The gearbox 142, 142' may include atop portion 210, the second gear receptacle 196, and the first gear receptacle 194 that may be disposed between the top portion 210 and the second gear receptacle 196. As an example, the top portion may define the attachment receptacle 208 configured to receive the attachment fastener 152. The first gear receptacle 194 may house the first gear or worm gear 148 and the second gear receptacle 196 may house the second gear or spindle gear 150. As described above, the second gear receptacle 196 includes the first end region 198 and the second end region 200 provided with the location feature 206 such as the flat.

The second gear or spindle gear 150 may include an inner periphery provided with one or more serrations 212 configured to receive and engage the spindle 144. After each gearbox 142, 142' is assembled to the motor bracket 124 to form the motor bracket assembly 118, the motor bracket assembly 118 may be positioned to adjacent to and pressed toward to the inboard and outboard rail assemblies 114, 116 so that the spindle 144 of the inboard rail assembly 116 and the spindle 144 of the outboard rail assembly 114 extends into the second gear 150 of each of the rail assemblies 114, 116.

FIG. 7A shows the gearbox 142, 142' in the uninstalled position and FIG. 7B shows the gearbox 142, 142' in the installed position. As mentioned above, the distal portions 172 of the arms 132, 134 may be formed by tabs 174 that may be angled away from the opposing arm 132, 134. As the gearbox 142, 142' is inserted along the directional arrow D1, the first arm 132 may deflect in the second direction D2 and the second arm 134 may deflect in the third direction D3. Once the gearbox 142, 142' is in the installed position, in which the first end region 198 of the second gear receptacle 196 is disposed in the first aperture 160 of the first arm 132 and the second end region 200 of the second gear receptacle 196 is disposed in the second aperture 162 of the second arm 134, the first arm 132 may deflect back along in the fifth direction D5 and the second arm 134 may deflect back in the fourth direction D4. Note, for the purposes of clarity, a number of components are not shown including a grommet 192 (FIG. 8), the first gear 148, and the second gear 150

Figure 8:
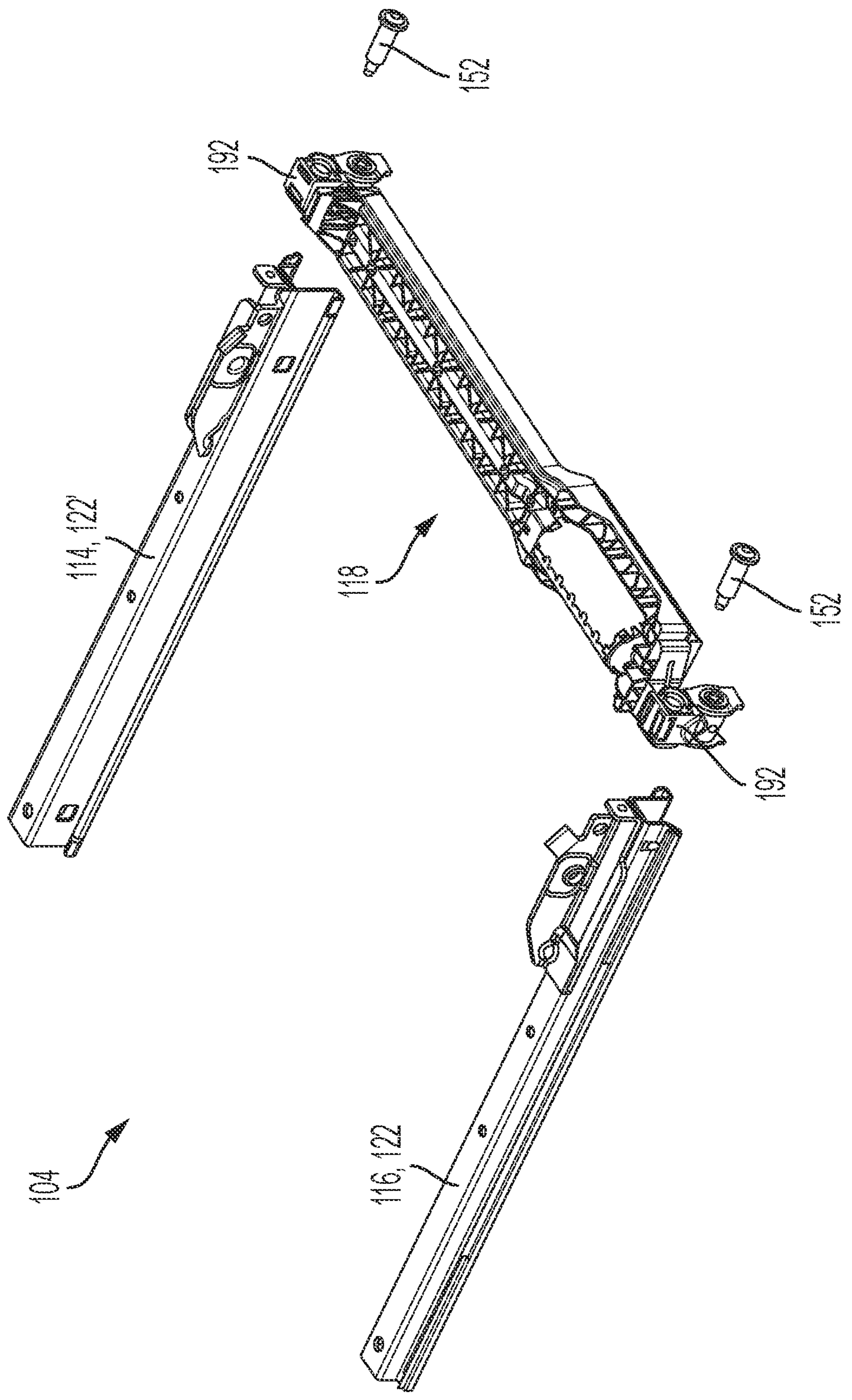
FIG. 8 illustrates a partial-perspective-exploded view of a portion of the longitudinal adjustment assembly.

FIG. 8 illustrates a perspective-exploded view of a portion of the longitudinal adjustment assembly 104. Note, for the purposes of clarity, a number of components are not shown including the fixed rails 120, 120', spindles 144, spindle attachment bracket 154, and spindle bushing 156. After installing the gearboxes 142, 142' to the first and second arms 132, 134 of the motor bracket 124, the motor bracket assembly 118 may be moved towards the rail assemblies 114, 116 so that the second gear 150 engages and is operatively coupled to the spindles 144. One or more attachment fasteners 152 may inserted through the grommet 192, attachment apertures 190 of the first and second arms 132, 134, the attachment receptacles 208 of the gearbox 142, 142', and into portions of the translatable rails 122, 122, such as an upper rail bracket.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

PARTS LIST

A Recliner Axis
100 vehicle seat
102 vehicle floor
104 longitudinal adjustment assembly

106 upper frame assembly
108 recliner assembly
110 back frame
112 seat cushion
114 outboard rail assembly
116 inboard rail assembly
118 motor bracket assembly
120 fixed rail inboard
120' fixed rail outboard
122 translatable rail inboard
122' translatable rail outboard
124 motor bracket
126 main body of motor bracket
128 first edge portion
130 second edge portion
132 first arm
134 second arm
136 motor
138 first transmission member
140 second transmission member
142 inboard gearbox
142' outboard gearbox
144 spindle
146 spindle nut
148 first gear/worm gear
150 second gear/spindle gear
152 attachment fastener
154 spindle attachment bracket
156 spindle bushing
158 transmission member cover
160 first aperture
162 second aperture
164 first cutout
166 second cutout
168 proximal portion of arm
170 medial portion of arm
172 distal portion of arm
174 tab
176 flat
178 ribs
180 outer periphery of spring arm
182 inner periphery first aperture
184 inner periphery of second aperture
186 first section
188 second section
190 attachment aperture
192 grommet
194 first gear receptacle/worm gear receptacle
196 second gear receptacle/spindle gear receptacle
198 first end region of spindle gear receptacle
200 second end region of spindle gear receptacle
202 outer periphery of first end region spindle gear receptacle
204 outer periphery of second end region of spindle gear receptacle
206 alignment feature
208 attachment receptacle
210 top portion
212 serrations

What is claimed is:

1. A longitudinal adjustment assembly for use in a vehicle seat, the longitudinal adjustment assembly comprising:

at least one fixed rail;

at least one translatable rail, the at least one translatable rail configured to translate along the at least one fixed rail to adjust a longitudinal position of the vehicle seat;

a spindle supported by the at least one fixed rail;

a gearbox configured for attachment to the at least one translatable rail;

at least one gear disposed in the gearbox, wherein the at least one gear is configured to be operatively connected to the spindle;

a motor;

a transmission member extending from the motor and into the gearbox, wherein the transmission member is configured to transmit rotational movement from the motor to the at least one gear; and a motor bracket including a main body and a pair of spring arms extending therefrom, wherein the main body of the motor bracket carries the motor, wherein each spring arm of the pair of spring arms are configured to deflect away from one another as the gearbox is inserted between the pair of spring arms, and wherein each spring arm of the pair of spring arms are configured to move towards one another in response to the gearbox being positioned in an installed position, and wherein an outer periphery of at least one spring arm of the pair of spring arms defines at least one cutout configured to facilitate deflection of the at least one spring arm.

2. The longitudinal adjustment assembly of claim 1, wherein the at least one translatable rail is configured to translate in a longitudinal direction to adjust the longitudinal position of the vehicle seat and wherein the gear housing and the pair of spring arms are collectively configured such that the gear housing is inserted between the pair of spring arms along a vertical direction, wherein the vertical direction is substantially orthogonal to the longitudinal direction.

3. The longitudinal adjustment assembly of claim 1, wherein the pair of spring arms includes a first spring arm and a second spring arm each having a proximal portion, a medial portion, and a distal portion, the medial portion disposed between the proximal portion and the distal portion, and wherein the distal portion of the first spring arm extends away from the second spring arm.

4. The longitudinal adjustment assembly of claim 1, wherein the pair of spring arms includes a first spring arm and a second spring arm each having a proximal portion, a medial portion, and a distal portion, the medial portion disposed between the proximal portion and the distal portion, wherein the at least one cutout includes a first cutout and a second cutout, and wherein the first cutout is disposed closer to the distal portion than the second cutout.

5. The longitudinal adjustment assembly of claim 1, wherein the pair of spring arms includes a first spring arm and a second spring arm each having a proximal portion, a medial portion, and a distal portion, the medial portion disposed between the proximal portion and the distal portion, wherein the proximal portion of the first spring arm is spaced apart from the proximal portion of the second spring arm by a first width, and the distal portion of the first spring arm is spaced apart from the distal portion of the second spring arm by a second width, and wherein the second width is greater than the first width.

6. The longitudinal adjustment assembly of claim 5, wherein the medial portion of the first spring arm is spaced apart from the medial portion of the second spring arm by a third width, and wherein the third width is less than at least one of the first width and the second width.

7. The longitudinal adjustment assembly of claim 1, wherein the gearbox includes a first gear receptacle and a second gear receptacle, wherein the at least one gear includes a first gear and a second gear, wherein the first gear is disposed in the first gear receptacle and is configured to receive an end portion of the spindle, wherein the second gear is disposed in the second gear receptacle and is configured to receive an end portion of the transmission member, and wherein at least one spring arm of the pair of spring arms defines an aperture, wherein an inner periphery of the aperture of the at least one spring arm is configured to lie along an outer periphery of a portion of the first gear receptacle when the gearbox is in the installed position.

8. The longitudinal adjustment assembly of claim 7, wherein the gearbox further includes an attachment receptacle, and the at least one spring arm defines an attachment aperture, wherein the attachment receptacle and the attachment aperture are each configured to receive a fastener to fix the motor bracket and the gearbox to the translatable rail, and wherein the second gear receptacle is disposed between the first gear receptacle and the attachment receptacle.

9. A motor bracket assembly for use in a vehicle seat, the vehicle seat including a translatable rail, a fixed rail, and a spindle assembly, the motor bracket assembly comprising:

a motor bracket including a main body, a first arm, and a second arm, wherein the main body includes a first lateral edge region and the first and second arms each extend from the first lateral edge region of the main body, wherein the first arm defines a first aperture and the second arm defines a second aperture;

a motor carried by the motor bracket;

a spindle gear operatively connected to the motor and configured to be operatively connected to the spindle assembly of the vehicle seat, wherein rotation of the spindle gear actuates the spindle assembly to translate the translatable rail along the fixed rail to adjust a longitudinal position of the vehicle seat; and a gearbox including a spindle gear receptacle provided with a first end region and a second end region, wherein the spindle gear is disposed in the spindle gear receptacle, and wherein the first end region is disposed in the first aperture of the first arm and the second end region disposed in the second aperture of the second arm, and wherein an outer periphery of the first end region defines a first diameter and an outer periphery of the second end region defines a second diameter, wherein the first diameter is less than the second diameter.

10. The motor bracket assembly of claim 9, wherein the outer periphery of the first end region and the outer periphery of the second end region are non-uniform.

11. The motor bracket assembly of claim 10, wherein the outer periphery of the second end region includes a first section and a second section, wherein the first section of the second end region has a substantially curvilinear shape.

12. The motor bracket assembly of claim 11, wherein the second section is formed by a flat.

13. The motor bracket assembly of claim 11, wherein at least one of the first arm and the second arm defines an attachment aperture and the gearbox further defines an attachment receptacle, wherein an inner periphery of the second aperture of the second arm includes a first section and a second section, wherein the second section of the outer periphery of the second end region of the first gear receptacle is configured to lie along the second section of the inner periphery of the second aperture so that the attachment aperture of the second arm is substantially aligned with the attachment receptacle of the gearbox.

14. The motor bracket assembly of claim 13, wherein the second arm includes a proximal portion, a distal end portion, and a medial portion disposed between the proximal portion and the distal end portion, wherein the proximal portion defines the attachment aperture, wherein the distal end portion extends away from the other of the at least one of the first arm and the second arm, wherein the medial portion defines the second aperture, and wherein the second section lies along the distal end portion.

15. A method of assembling a motor bracket assembly for use in a vehicle seat, the method comprising:

attaching a motor to a main body of a motor bracket, the main body including a first edge region and a second edge region, wherein the motor bracket includes a first spring arm and a second spring arm, the first and second spring arms extending from the first edge region of the main body;

inserting a gearbox between the first spring arm and the second spring arm so that the first spring arm deflects outwardly and away from the second spring arm; and fixing the gearbox to the motor bracket, wherein the fixing step includes, the first spring arm deflecting inwardly towards the second spring arm so that the gearbox is fixed to the first spring arm and the second spring arm, positioning a first portion of a spindle gear receptacle of the gearbox into an aperture defined by the first spring arm, and rotating the gearbox so that a first locating feature formed on an outer periphery of the spindle year receptacle engages a second locating feature formed on an inner periphery of an aperture defined by the second spring arm.

* * * * *